United States Patent
Schouest et al.

(10) Patent No.: US 7,282,100 B1
(45) Date of Patent: Oct. 16, 2007

(54) METHOD OF CLEANING AUTOMOBILE PAINTED SURFACES AND AUTOMOBILE GLASS SURFACES

(76) Inventors: Bryan Schouest, 3815 Hessmer Ave., Metairie, LA (US) 70002-3211; Harrison M. Weber, 4921 Lake Park La., Acworth, GA (US) 30101

(*) Notice: Subject to any disclaimer, the term of this patent is extended or adjusted under 35 U.S.C. 154(b) by 427 days.

(21) Appl. No.: 10/898,890

(22) Filed: Jul. 26, 2004

Related U.S. Application Data (63) Continuation-in-part of application No. 10/353,852, filed on Jan. 28, 2003, now Pat. No. 7,135,446.

(60) Provisional application No. 60/352,435, filed on Jan. 28, 2002, provisional application No. 60/563,059, filed on Apr. 16, 2004, provisional application No. 60/489,790, filed on Jul. 24, 2003.

(51) Int. Cl.
*B08B 3/02* (2006.01)

(52) U.S. Cl. ............... 134/34; 510/180; 510/181; 510/241; 510/406; 510/507; 510/509; 510/510; 134/36; 134/37; 134/38; 134/42

(58) Field of Classification Search ........... 510/180, 510/241, 181, 406, 507, 509, 510; 134/34, 134/36, 37, 38, 42
See application file for complete search history.

(56) References Cited

U.S. PATENT DOCUMENTS

| | | | |
|---|---|---|---|
| 3,928,065 A * | 12/1975 | Savino | 134/7 |
| 4,002,571 A * | 1/1977 | Anderle et al. | 510/406 |
| 4,005,027 A * | 1/1977 | Hartman | 510/369 |
| 4,051,056 A | 9/1977 | Hartman | |
| 4,203,857 A * | 5/1980 | Dugan | 15/104.93 |
| 4,338,377 A | 7/1982 | Beck et al. | |
| 4,395,456 A | 7/1983 | Jackson et al. | |
| 4,436,637 A * | 3/1984 | Ramachandran et al. | 510/328 |
| 4,450,151 A | 5/1984 | Shinozawa | |
| 4,687,591 A | 8/1987 | Castaldo | |
| 4,877,691 A * | 10/1989 | Cockrell, Jr. | 428/688 |
| 5,034,114 A | 7/1991 | Kukin | |
| 5,076,952 A | 12/1991 | Ahmed et al. | |
| 5,128,027 A | 7/1992 | Halaka et al. | |
| 5,364,551 A * | 11/1994 | Lentsch et al. | 510/100 |
| 5,712,355 A | 1/1998 | Jones | |
| 5,779,912 A | 7/1998 | Gonzalez-Martin et al. | |
| 5,846,650 A | 12/1998 | Ko et al. | |
| 5,872,111 A | 2/1999 | Au et al. | |
| 5,928,064 A | 7/1999 | Miller | |
| 5,969,067 A | 10/1999 | Brothers et al. | |
| 5,981,459 A * | 11/1999 | Verbiest et al. | 510/279 |
| 6,156,389 A | 12/2000 | Brown et al. | |
| 6,177,196 B1 | 1/2001 | Brothers et al. | |
| 6,183,872 B1 | 2/2001 | Tanaka et al. | |
| 6,207,780 B1 | 3/2001 | Stockhausen et al. | |
| 6,241,579 B1 | 6/2001 | Miller, III et al. | |
| 6,310,014 B1 | 10/2001 | Rau | |

FOREIGN PATENT DOCUMENTS

CN 1050559 A * 4/1991
EP 0103446 A1 * 3/1984

* cited by examiner

*Primary Examiner*—Sharidan Carrillo (57) ABSTRACT

A system for cleaning acid rain and mineral deposits from glass and/or painted surfaces includes powdered kaolin clay. The glass is preferably cleaned with this system, then a system for more effectively delivering Fibershield 218 and like protectants to glass is used to add a protectant.

21 Claims, 4 Drawing Sheets

METHOD OF CLEANING AUTOMOBILE PAINTED SURFACES AND AUTOMOBILE GLASS SURFACES

CROSS-REFERENCE TO RELATED APPLICATIONS

This is a continuation-in-part of U.S. patent application Ser. No. 10/353,852, filed 28 Jan. 2003 now U.S. Pat. No. 7,153,446 which application claimed priority to U.S. Provisional patent application Ser. No. 60/352,435, filed 28 Jan. 2002.

Priority is hereby claimed to the following applications: U.S. Provisional patent application Ser. No. 60/563,059, filed 16 Apr. 2004; U.S. Provisional patent application Ser. No. 60/489,790, filed 24 Jul. 2003; U.S. patent application Ser. No. 10/353,852, filed 28 Jan. 2003; and U.S. Provisional patent application Ser. No. 60/352,435, filed 28 Jan. 2002.

The following applications are incorporated herein by reference: U.S. Provisional patent application Ser. No. 60/563,059, filed 16 Apr. 2004; U.S. Provisional patent application Ser. No. 60/489,790, filed 24 Jul. 2003; U.S. patent application Ser. No. 10/353,852, filed 28 Jan. 2003; and U.S. Provisional patent application Ser. No. 60/352,435, filed 28 Jan. 2002.

STATEMENT REGARDING FEDERALLY SPONSORED RESEARCH OR DEVELOPMENT

Not applicable

REFERENCE TO A "MICROFICHE APPENDIX"

Not applicable

BACKGROUND

The present invention relates to glass and paint finishes. More particularly, the present invention relates to cleaning and protecting painted surfaces and glass surfaces.

Acid rain and minerals cause spots on glass such as on automobile windows, windshields, and painted surfaces which are difficult to remove. One commercially available method of removing these spots on painted and glass surfaces involves rubbing with a piece of clay (see, for example, products sold under the trademark CLAY-MAGIC, US Trademark Registration No. 1,890,761). However, this is a relatively difficult job and is typically only done professionally and not by "do-it-your-selfers."

Glass, glass windshields, and painted surfaces become contaminated with acid rain and mineral spots and by mineral deposits from rain and other fluid sources. These contaminants are extremely difficult to remove, except by professional treatment. This treatment often involves grinding away the deposits with a buffing machine which uses an abrasive compound. This treatment has a high risk of permanently scratching the surface finish.

It is known in the automotive aftermarket trade that kaolin clay can remove mineral deposits from painted surfaces if properly applied. The prior art method involves dragging a solid block of clay across the painted surface while using a soapy water solution as a lubricant. This prevents scratching and prevents drag, however, the process is difficult and requires a high skill level. If the bar is not rotated frequently, the accumulated contaminant will quickly scratch the finish. It is also a process not lending itself to glass. Kaolin clay by itself will not scratch the glass since the material is softer, but the mineral deposits along with other contaminants picked up by the clay bar are much harder and can scratch.

Kaopolite SF (super fine kaolin clay) has been used for many years in car polishes for painted surfaces.

Fibershield 218, commercially available from Fibershield Industrials, is a coating for aircraft windows to help them repel rain, making it sheet. Fibershield 7525 is a similar coating.

A web site sponsored by PPG tells about their product "Aquapel." It appears to be the same type of chemistry as Fibershield 218. However, it is applied using a special sponge applicator. The PPG product is for professional use and believed to be a standard water-based product requiring buffing clear. Aquapel makes no claims as scratch resistance nor any claims about treating acrylics (either Plexiglas or polycarbonate).

The following US patents are incorporated herein by reference: U.S. Pat. Nos.: 4,051,056; 4,338,377; 4,395,456; 4,450,151; 4,687,591; 5,034,114; 5,076,952; 5,128,027; 5,712,355; 5,779,912; 5,846,650; 5,872,111; 5,928,064; 5,969,067; 6,177,196; 6,183,872; 6,207,780; 6,241,579; and 6,310,014.

U.S. Pat. No. 4,687,591 discloses an aerosol cleaning composition with 15-25% by weight kaolin clay for cleaning cymbals.

U.S. Pat. No. 4,450,151 discloses an aerosol composition which could contain 5-60% by weight kaolin clay.

U.S. Pat. No. 5,076,952 discloses a liquid dishwasher cleaning agent which can contain clay particles, sodium bicarbonate and sodium tripolyphosphate.

U.S. Pat. No. 4,395,456 discloses an inorganic foam which can include kaolin clay.

U.S. Pat. No. 5,034,114 discloses neutralizing acid with a solution containing sodium bicarbonate and a detergent tripolyphosphate.

U.S. Pat. No. 6,241,579 discloses a surface polishing applicator system and method. U.S. Pat. No. 5,928,064 discloses a surface polishing method and system. Both of these patents are assigned to Auto Wax Company, Inc., the maker of Clay Magic brand polish and bars containing abrasive material for removing stains from automobiles. U.S. Pat. No. 5,846,650 discloses a protective coating for windshields (see column 1; line 9) that prevents ice build-up and contains a fluoropolymer and a fluorochemical surfactant (see column 2, lines 35-42).

U.S. Pat. Nos. 5,969,067 and 6,177,196 disclose a coating solution containing a fluoropolymer, which can be applied to a windshield (see column 7, lines 7 and 8).

U.S. Pat. No. 6,156,389 discloses a protective coating that is applied to windshield and contains a fluoropolymer (see claim 3 in Column 32). U.S. Pat. No. 5,712,355 discloses a formulation that contains fluoropolymers, fluorosurfactants and water that is applied to glass microscope slides as a protectant.

U.S. Pat. No. 6,183,872 discloses a fluoropolymer coating which apparently chemically bonds to glass (see column 3, lines 35-40).

BRIEF SUMMARY

In one embodiment the present invention includes a system for cleaning acid rain marks and other contaminants from glass and a system for more effectively delivering glass protectants such as Fibershield 218 and the like.

In one embodiment the present invention includes an apparatus for cleaning glass having acid rain deposits and/or mineral deposits, preferably comprising:

a foaming clay windshield cleaner comprising:
  clay for freeing mineral deposits;
  sodium bicarbonate for neutralizing acid rain deposits; and
  a chelator to keep the deposits from clinging on the glass and re-depositing. The chelator is preferably sodium tripolyphosphate. The cleaner is preferably formulated as a convenient, effective aerosol foam or as a convenient, effective aerosol spray. The clay is preferably kaolin clay. Preferably, synthetic detergent is included to clean away and suspend both mineral deposits and acid rain deposits. Most preferably, the cleaner includes an aerosol foaming propellant.

In one embodiment the present invention includes a method of cleaning glass, comprising spraying the apparatus of the present invention mentioned in the paragraph above on glass;
  allowing the cleaner to be rubbed on the glass for a period of time such as between 1 second to 15 minutes or between 5 minutes to 15 minutes, rubbing with a sponge;
  rubbing the cleaner off with a soft cloth.

In one embodiment the present invention includes a system for more effectively delivering glass protectants such as Fibershield 7525 and the like, the system comprising a concentrate comprising:
  80-90% by weight water;
  5-15% by weight fluoropolymer. The concentrate preferably further comprises about 1.0-20 by weight wetting agent. The system can comprise about 80% by weight of the concentrate and about 20% by weight of a propellant.

In one embodiment the present invention includes a system for more effectively delivering glass protectants such as Fibershield 218 and the like, the system comprising a concentrate comprising:
  60-90% by weight alcohol;
  5-15% by weight fluoropolymer;
  5-10% by weight acetone; and
  20-30% by weight aerosol propellant. The alcohol can comprise isopropyl alcohol, propanol, acetone/ketone, and/or ethanol (specially denatured or fully denatured).

In one embodiment the present invention includes a kit for cleaning and protecting glass, comprising:
  a clay mixture;
  a glass and surface cleaner;
  a fluoropolymer delivery agent. Preferably, the clay mixture comprises a foaming clay glass cleaner comprising:
  clay for freeing mineral deposits;
  sodium bicarbonate for neutralizing acid rain deposits; and
  a chelator to keep the deposits from clinging on the glass and re-depositing; and the fluoropolymer delivery agent comprises:
  60-90% by weight alcohol;
  5-15% by weight fluoropolymer;
  5-10% by weight acetone; and
  20-30% by weight aerosol propellant.
  Preferably, the glass and surface cleaner comprises:
  a chelator, a diluent, a solvent, a surfactant, a pH builder, and a propellant.

In one embodiment the present invention includes apparatus for cleaning painted surfaces having acid rain deposits and/or mineral deposits, preferably comprising:
  a foaming clay cleaner comprising:
  clay for freeing mineral deposits;
  sodium bicarbonate for neutralizing acid rain deposits; and
  a chelator to keep the deposits from clinging on the paint finish and re-depositing. The chelator is preferably sodium tripolyphosphate. The cleaner is preferably formulated as an aerosol foam or aerosol spray. The clay is preferably kaolin clay. Preferably, synthetic detergent is included to clean away and suspend both mineral deposits and acid rain deposits. Most preferably, the cleaner includes an aerosol foaming propellant.

In one embodiment the present invention includes a method of cleaning painted surfaces, comprising spraying the apparatus of the present invention mentioned in the paragraph above on paint;
  allowing the cleaner to be rubbed on the painted surface for a period of time such as between 1 second to several minutes or between 5 minutes to 15 minutes;
  rubbing the cleaner off with a soft cloth.

In one embodiment the present invention includes an aerosol micro-clay compound suspended in a foaming detergent base used to remove contaminants from metal, glass, and plastic surfaces, including painted surfaces.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION

The cleaning system can comprise a clay-based formula including kaolin clay in powder form mixed with lubricants, other cleaners, and delivery agents. This formula is preferably delivered to glass by spraying, using an aerosol foaming propellant.

Before applying the glass treatment system in one embodiment, it is desirable to have a clean, uncontaminated glass surface prior to treatment for the polymer to achieve maximum effectiveness. The foaming clay cleaner of a preferred embodiment can incorporate kaolin clay, combined with sodium bicarbonate and synthetic detergent to clean away and suspend both mineral deposits and acid rain contaminant on glass. The sodium bicarbonate neutralizes the acid rain deposit(s). Chelators (such as sodium tripolyphosphate) can keep contaminant particles from clinging on the glass and re-depositing. The clay frees the mineral deposits. These three things are believed to be the most important ingredients. Additionally, the product can be (and preferably is) an aerosol foam or spray.

The device of a preferred embodiment can safely and easily remove mineral deposits and acid rain contaminants from glass such as auto glass and windshields. It is a mechanism incorporating chemical and mechanical action and differs from commercial buffing so that the procedure and device can be applied by a user without special training, machinery or skills. The device is an easy-to-use unique inverted aerosol foam that clings to the glass prior to treatment and facilitates clean clay with every application. This embodiment is a chemical/mechanical glass cleaner designed to specifically remove mineral and acid rain deposits. And, unlike the clay bar, this is a one-step process.

A smooth surface is in fact microscopically bumpy and consists of micro-sized hills and valleys. Many particles called contaminants have an atomic charge associated with them. Other contaminants such as road film, bug debris, acid rain, animal deposits, etc. have a chemical glue. Both of these mechanisms allow the contaminant particles to adhere to a surface. In one embodiment kaolin clay attacks the bonds of charged contaminant particles. In one embodiment soy esters, acid neutralizers, and surfactants can be included to attack chemical glue bonding. In one embodiment a foam is used to reach particles adhering in valleys in the surface as well as particles adhering to the tops of hills. In one embodiment a sponge 20 (see FIG. 3) is used to work into a surface being treated the cleaning solution along with acting as a receptacle for dislodged contaminant particles.

In one embodiment sponge 20 (FIGS. 1, 2, and 3) is preferably yellow in color and is very cellular in appearance. It is preferably made of polypropylene such as that made by SwissTex in Switzerland and preferably has large pores of about 1-25 mm and numerous smaller pores. Sponge 20 preferably measures about 3×5×1 inches (the measurements of the sponge can vary). In one embodiment sponge 20 is prepared for cleaning using the following method. Soak sponge 20 in clean warm water for a minimum of 3 minutes. Squeeze out water from sponge 20 leaving sponge 20 damp. During use rinse sponge 20 in a warm water bath to keep the sponge clean and remove contaminant particles.

A preferred glass cleaner formula is set out below:

| Preferred Clay Glass Cleaner Formula: | | |
| --- | --- | --- |
| Chemical | Function | Percentage by Weight |
| Water (preferably deionized water or distilled water, though one could use tap water if an aluminum container is used) | Diluent | Preferably about 30-70<br>More preferably about 60-70<br>Most Preferably about 62-66<br>About 65.34, for example |
| Sodium Benzoate | Can preservative (optional, could be omitted, and more water could be used) | Preferably about 1.0-0.10<br>More preferably about 0.80-0.10<br>Most Preferably about 0.70-0.10<br>About 0.20, for example |
| A water soluble phosphate, or nitrilo acetic acid (NTA)), preferably Sodium Tripolyphosphate | Chelator | Preferably about 2.0-0.10<br>More preferably about 1.5-0.25<br>Most Preferably about 1.0-0.40<br>About 0.504, for example |
| Dehydrated Clay, preferably Dehydrated Kaolin Clay | Cleans mineral deposits | Preferably about 25-5.0<br>More preferably about 15-6<br>Most Preferably about 12-7<br>About 10, for example |
| Neutralizer, preferably sodium bicarbonate (but calcium carbonate, for example, could be used also) | Cleans acid deposits | Preferably about 10-0.6<br>More preferably about 9-0.7<br>Most Preferably about 7-1.0<br>About 1.0, for example |
| Synthetic (non-ionic) detergent | Emulsifier and cleaner | Preferably about 10-0.20<br>More preferably about 7-0.4<br>Most Preferably about 6-0.5<br>About 1.998, for example |

-continued

Preferred Clay Glass Cleaner Formula:

| Chemical | Function | Percentage by Weight |
| --- | --- | --- |
| Solvent, such as soy bean ester, hydrocarbon solvent (napthenic or paraffinic, glycol ether, vegetable oil, alcohols or any solvent with a KB (Kauri Butanol value) low enough to not damage the glass but high enough to add cleaning power). | Solvent degreaser | Preferably about 30-5.0<br>More preferably about 20-7<br>Most Preferably about 15-8<br>About 9.990, for example |
| Oil, preferably silicone oil | Lubricant, brightener | Preferably about 5-0.1<br>More preferably about 3-0.10<br>Most Preferably about 2-0.20<br>About 1.95, for example |
| Hydrocarbon propellant or, e.g., $CO_2$, Dimethyl ether, 143A or 152A | Aerosol foaming propellant | Preferably about 15-4.0<br>More preferably about 13-5<br>Most Preferably about 12-7<br>About 10, for example |

Figures 1, 2:
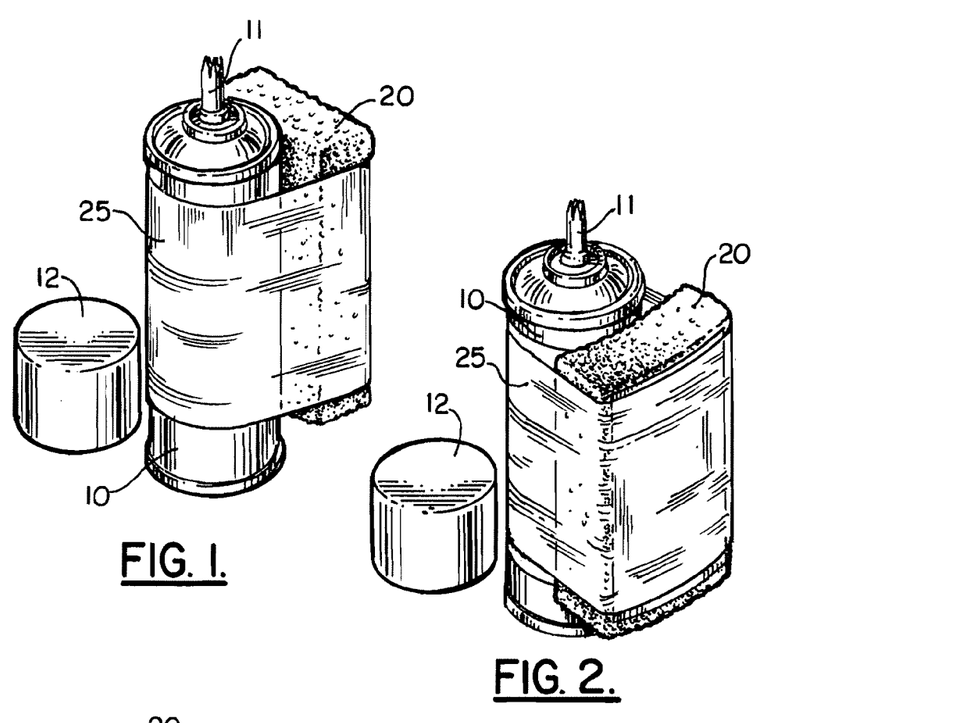
FIGS. 1 and 2 show an aerosol can with a sponge of a preferred embodiment of the apparatus of the present invention.

In one embodiment the clay-based cleaning product is preferably packaged as an inverted whipped cream-like foam (preferably with a valve 11 typically used on whipped cream containers—see can 10 in FIGS. 1 and 2) but can also be sprayed upright with a preferably clog-resistant valve. This product can also be sprayed as a solvent-based aerosol. It can be sprayed similar to touch-up like paint or it can be packaged as a thick liquid squirted through a flip-top lid. Additionally, though not preferred, it can be applied as a cream or paste. Preferably it includes a clay/sodium bicarbonate glass cleaner designed to clean away mineral and acid deposits on glass. The glass can be wiped immediately, or the cleaner may be allowed to sit on the glass for a period of time such as between 1 second to several minutes or between 5 minutes to 15 minutes; the glass can then be buffed with a soft cloth for about 10 seconds to 10 minutes to remove the stains. The stains are removed through a chemical process in which the formula reacts with the stains to cause them to stop adhering to the glass.

One embodiment is a system for more effectively delivering glass protectants such as Fibershield 218 and the like. Two formulations have been developed, one water-based and the other isopropyl alcohol (IPA) based. This system preferably sprays on. It can also be a fast drying alcohol based system. Alcohol can also improve the wetting action. The formulas are as follows:

Water Based Formulas For Glass Protectants:

| Chemical | Function | Percentage by Weight |
| --- | --- | --- |
| Water | diluent | Preferably about 60-98<br>More preferably about 65-96<br>Most Preferably about 80-95<br>90, for example |
| fluoropolymer (such as Fibershield 218, but preferably Fibershield 7525) | | Preferably about 5-15<br>More preferably about 6-14<br>Most Preferably about 7-13<br>10.00, for example |
| Polar solvent (such as an alcohol, a ketone, or a glycol ether) | wetting agent (optional) | Preferably about 1.0-20<br>More preferably about 4-15<br>Most Preferably about 5-10<br>About 5, for example |

If used in a pump, the water-based formula is preferably used as is. If used in an aerosol, one could use, e.g., 80% of the water-based formula and 20% of a propellant, such as aerosol propellant A/46 (a propane/isobutane blend). In either event, a fluorosurfactant (DuPont ISP 100 or equivalent) or a 9-13 mole nonylphenyl surfactant could be used, in an amount of about 0.005 percent by weight. However, preferably no fluorosurfactant is used.

Isopropyl Alcohol ("IPA") Based For Glass Protectants (preferred formulation):

| Chemical | Function | Percentage by Weight |
| --- | --- | --- |
| alcohol, preferably isopropyl alcohol or ethanol (specially denatured or fully denatured), but propanol and acetone/ketone (and combinations of all of these) could also be used | diluent | Preferably about 60-90<br>More preferably about 61-80<br>Most Preferably about 63-70<br>About 63.9, for example |
| fluoropolymer (preferably Fibershield 218) | Protectant | Preferably about 5-15<br>More preferably about 6-14<br>Most Preferably about 6.5-12<br>About 8.0, for example |

-continued

Isopropyl Alcohol ("IPA") Based For Glass Protectants
(preferred formulation):

| Chemical | Function | Percentage by Weight |
|---|---|---|
| A polar solvent, preferably acetone | to increase solubility | Preferably about 5-30<br>More preferably about 5-10<br>Most Preferably about 6-9<br>About 8.0, for example |
| aerosol propellant A146 (or nitrous oxide or dimethyl ether or $CO_2$ or nitrogen) | propellant | Preferably about 14-30<br>More preferably about 15-28<br>Most Preferably about 16-25<br>20.0, for example |

The IPA based formula can use other alcohols, such as propanol, acetone/ketone, and/or ethanol (specially denatured or fully denatured).

Fibershield 218 uses hydrogen bonding to bond to the glass; it polymerizes in about 24 hours, providing a thin film which protects the glass. This thin film lasts several weeks at least, and perhaps even several months. Additional coatings can be applied over earlier coatings.

In one embodiment the method and coating system of the present invention can be used on ceramic tiles and stone containing silicon dioxide (e.g., granite, marble), plastic and painted surfaces as well as glass.

In one embodiment the glass and surface cleaner of the present invention is specifically designed to work with the entire system of the present invention. The cleaner can include special detergents (sodium bicarbonate and nonionic surfactant) which target embedded deposits in the grooves of glass and glasslike surfaces. The cleaner can help users prepare their surface before the application of the clay embodiment of the present invention and also helps remove the residual clay residue before the shield product of the present invention is applied. A foaming action of the glass and surface cleaner can indicate to users that it is working and can wipe away clean without leaving streaks.

Preferred Glass and Surface Cleaner Formulation

| Chemical | Function | Percentage by Weight |
|---|---|---|
| A water soluble phosphate, or nitrilo acetic acid (NTA)), preferably Sodium Tripolyphosphate | chelator | Preferably about 0.1-2<br>More preferably about 0.2-1.5<br>Most Preferably about 0.3-0.8<br>About 0.5, for example |
| Water | diluent | Preferably about 90-50<br>More preferably about 85-60<br>Most Preferably about 85-70<br>About 83.2, for example |
| a chelator, preferably sodium bicarbonate or calcium carbonate | chelator | Preferably about 0.1-2<br>More preferably about 0.2-1.5<br>Most Preferably about 0.3-0.8<br>About 0.5, for example |
| Any ethylene or propylene glycol ether, preferably Butyl Cellosolve ™ brand Ethylene Glycol Mono-n-butyl Ether | solvent | Preferably about .1-5<br>More preferably about .3-3<br>Most Preferably about .4-2<br>About 1, for example |
| Non-ionic surfactant with an HLB (hydrophilic lithophilic balance) of 9-13, nonylphenyl surfactant, 9-13 moles of ethylene oxide | Surfactant | Preferably about 1-.05<br>More preferably about .7-.09<br>Most Preferably about .6-.2<br>About .3, for example |
| Solvent, preferably | Solvent | Preferably about 5-.1 |

-continued

Preferred Glass and Surface Cleaner Formulation

| Chemical | Function | Percentage by Weight |
|---|---|---|
| Methylal [Dimethyl Formal] | | More preferably about 4-.3<br>Most Preferably about 3-.5<br>About 1, for example |
| Alcohols or ketones, preferably ethanol or Isopropyl Alcohol (IPA) (or combinations of all of these) | solvent | Preferably about 15-.3<br>More preferably about 10-.5<br>Most Preferably about 8-.9<br>About 7, for example |
| Aqueous ammonia (or any ammonia bearing amine) | pH Builder | Preferably about .05-1<br>More preferably about .06-.9<br>Most Preferably about .07-.8<br>About 0.2, for example |
| Hydrocarbon Propellant A-46 (or nitrous oxide or dimethyl ether or $CO_2$ or nitrogen) | Propellant | Preferably about .2-12<br>More preferably about .5-10<br>Most Preferably about .7-9<br>About 6, for example |

A preferred embodiment includes a kit for spraying the composition comprising a clay cleaner (preferably one of the clay embodiments disclosed in this application), a glass and surface cleaner (preferably one of the glass and surface cleaner embodiments disclosed in this application), and a fluoropolymer delivery agent (preferably one of the IPA-based formula embodiments disclosed in this application which can include Fibershield 218).

Another embodiment of the present invention relates to a clay composition for application to painted surfaces.

Preferred Clay Composition for Painted Surfaces

| Chemical | Example % by weight |
|---|---|
| Water, deionized | 56.0 |
| Sodium tripolyphosphate | 0.50 |
| Kaolin clay (powdered, brand Kaopolite SF grade (super fine)) | 20.0 |
| Sodium bicarbonate | 0.5 |
| Premix: | |
| Nonionic surfactant (9 moles of ethylene oxide, nonyl phenyl surfactant) | 2.0 |
| Soy methyl ester solvent | 10.0 |
| Isopropyl alcohol (90-100% pure) | 1.0 |
| Add premix to water phase. | |
| Hydrocarbon blend: Propane/isobutane Aerosol grade A146 | 10.0 |
| | 100.0% |

In one embodiment the method of contaminant removal from painted surfaces of the present invention can be used for ceramic tiles, stone, grout, and other hard and/or porous surfaces.

The aerosol concentrate is preferably packaged into a steel or aluminum can 10 and sealed with a "whipped cream" style valve assembly 11 for inverted spraying. The most effective useable range of the clay is 18-25%. 20% is optimum as it presents the best balance of appearance and function. Over 20% starts to get sticky.

Preferred Clay Formula for Paint

| Chemical | Function | Percentage by Weight |
|---|---|---|
| Water (preferably deionized water or distilled water, though one could use tap water if an aluminum container is used) | Diluent | Balance<br>About 56, for example |
| A water soluble phosphate, or nitrilo acetic acid (NTA)), preferably Sodium Tripolyphosphate | Chelator | Preferably about 0.10-2.00<br>More preferably about 0.20-1.50<br>Most Preferably about 0.25-0.75<br>About 0.50, for example |
| Dehydrated Clay, preferably Dehydrated Kaolin Clay | Cleans mineral deposits | About 25-15.0<br>Preferably about 22.00-15.0<br>More preferably about 21.00-18.00<br>Most Preferably about 20.5-19.00<br>About 20, for example |
| Neutralizer, preferably sodium bicarbonate (but calcium carbonate, for example, could be used also) | Cleans acid deposits | Preferably about 0.10-4.00<br>More preferably about 0.20-1.00<br>Most Preferably about 0.25-0.75<br>About 0.5, for example |
| Non-ionic surfactant (8.5-11.5 (e.g. 9) moles of ethylene oxide, nonyl phenyl surfactant -e.g. Triton X-100) | Surfactant | Preferably about 0.05-2.5<br>More preferably about 1.0-2.5<br>Most Preferably about 1.5-2.4<br>About 2.0, for example |
| Solvent, such as soy methyl ester solvent, soy bean ester, hydrocarbon solvent (napthenic or paraffinic, glycol ether, vegetable oil, petroleum naphtha, alcohols or any solvent with a KB (Kauri Butanol value) low enough to not damage the paint but high enough to add cleaning power). | Solvent degreaser | Preferably about 0-20.0<br>More preferably about 5-12<br>Most Preferably about 9-10.5<br>About 10.0, for example |
| Alcohols or ketones, preferably ethanol or Isopropyl Alcohol (IPA - 90-100% pure) (or combinations of all of these) | solvent | Preferably about .5-1.5<br>More preferably about .7-1.5<br>Most Preferably about .9-1.1<br>About 1.0, for example |
| Hydrocarbon Propellant A-46 (or propane/isobutane, neat, or nitrous oxide or dimethyl ether or $CO_2$ or nitrogen) | Propellant | Preferably about 4-12<br>More preferably about 5-11<br>Most Preferably about 9-10.5<br>About 10.0, for example |

Alternative Clay Formula for Paint

| Chemical | Function | Percentage by Weight |
|---|---|---|
| Water (preferably deionized water or distilled water, though one could use tap water if an aluminum container is used) | Diluent | Balance<br>About 65.34, for example |
| Sodium Benzoate | Can preservative (optional, could be omitted, and more water could be used) | Preferably about 1.0-0.10<br>More preferably about 0.80-0.10<br>Most Preferably about 0.70-0.10<br>About 0.20, for example |
| A water soluble phosphate, or nitrilo acetic acid (NTA)), preferably Sodium Tripolyphosphate | Chelator | Preferably about 2.0-0.10<br>More preferably about 1.5-0.25<br>Most Preferably about 1.0-0.40<br>About 0.504, for example |
| Dehydrated Clay, preferably Dehydrated Kaolin Clay | Cleans mineral deposits | About 25-15.0<br>Preferably about 22.00-15.0<br>More preferably about 21.00-18.00<br>Most Preferably about 20.5-19.00<br>About 20, for example |
| Neutralizer, preferably sodium bicarbonate (but calcium carbonate, for example, could be used also) | Cleans acid deposits | Preferably about 10-0.6<br>More preferably about 9-0.7<br>Most Preferably about 7-1.0<br>About 1.0, for example |
| Synthetic (non-ionic) detergent | Emulsifier and cleaner | Preferably about 10-0.20<br>More preferably about 7-0.4<br>Most Preferably about 6-0.5<br>About 1.998, for example |

-continued

Alternative Clay Formula for Paint

| Chemical | Function | Percentage by Weight |
|---|---|---|
| Solvent, such as soy bean ester, hydrocarbon solvent (napthenic or paraffinic, glycol ether, vegetable oil, alcohols or any solvent with a KB (Kauri Butanol value) low enough to not damage the glass but high enough to add cleaning power). | Solvent degreaser | Preferably about 30-5.0<br>More preferably about 20-7<br>Most Preferably about 15-8<br>About 9.990, for example |
| Oil, preferably silicone oil | Lubricant, brightener | Preferably about 5-0<br>More preferably about 3-0.10<br>Most Preferably about 2-0.20<br>About 0 or about 1.95, for example |
| Hydrocarbon propellant or, e.g., $CO_2$, Dimethyl ether, 143A or 152A | Aerosol foaming propellant | Preferably about 15-4.0<br>More preferably about 13-5<br>Most Preferably about 12-7<br>About 10, for example |

The clay embodiment is preferably used before the wax embodiment. This helps to insure a contaminant-free surface for the wax application. The wax is preferably applied using a terry cloth applicator sponge 30 (see FIG. 6) measuring preferably roughly 5×3½×1 inches (however the size of sponge 30 can vary.) Sponge 30 is preferably made from a towel-like material, such as cotton or a poly-cotton blend, with preferably approximately 50-300 threads per inch. The wax is applied like most waxes and let dry to a haze.

In an alternative embodiment a microfiber towel 40 (FIG. 5) can be used to aid in the removal of wax (and optionally used to remove the clay cleaner after the cleaner is applied with the sponge embodiment). Towel 40 is preferably blue in color and preferably measures roughly 16×16 inches. Towels 40 are preferably made of polycotton or a polyamide blend, with preferably approximately 50 k-90 k threads per inch. Each square inch in towel 40 preferably contains approximately 90,000 microfibers. Unlike ordinary cotton towels that move or push dirt, dust, and other contaminant particles from one point to another, microfiber can get underneath the particles lifting them from the surface. Towel 40 then stores contaminant particles in towel 40, until it is washed.

In one embodiment a wax (FIG. 7) is used which includes a blend of carnauba wax and polymers such as flourinated monomers which polymerize in the presence of water (humidity) and leave a "Teflon-like" protective film. This residual film resists harsh environmental contaminants such as acid rain, road salts, pollution, oils, salt spray, UV light, and the like. The film keeps the surface cleaner longer, enhances shine and brilliance, and helps eliminate fine scratches. The added Carnauba provides traditional water repellancy and shine. The wax can be stored in bottle 60 which can include a push and squeeze type lid which is commercially available.

Preferred Clay Formula For Wax:

| Chemical | Function | Percentage by Weight |
|---|---|---|
| Water, deionized | Diluent | Preferably about 60-90<br>More preferably about 70-95<br>Most Preferably about 78-82<br>About 80.5999, for example |
| Powdered Kaolin clay | Mild Abrasive | Preferably about 5-25<br>More preferably about 7-20<br>Most Preferably about 9-11<br>About 10.0, for example |
| Carbopol carbomer resin (EZ-1) | Thickener/emulsifier | Preferably about .05-.25<br>More preferably about .09-.22<br>Most Preferably about .16-.20<br>About 0.18, for example |
| Pale yellow dye | Dye | Preferably about .00008-.001<br>More preferably about .0004-.0009<br>Most Preferably about .00002-.00004<br>About 0.0001, for example |
| Carnauba wax (20% emulsion) | Protectant/shine | Preferably about .90-.01<br>More preferably about .60-.06<br>Most Preferably about .40-.10<br>About 0.30, for example |

Preferred Clay Formula For Wax:

| Chemical | Function | Percentage by Weight |
|---|---|---|
| V,M&P Naphtha(CAS#64742-89-8) | Solvent, cleaner | Preferably about 1.0-10.0<br>More preferably about 3.0-8.0<br>Most Preferably about 4.0-5.2<br>About 5.02, for example |
| Lemon perfume | Perfume | Preferably about 1.0-.05<br>More preferably about .5-.1<br>Most Preferably about .3-.13<br>About 0.2, for example |
| Fluoropolymer (preferred brand: DermaGlo(55500C ™) | Water repellant/shine | Preferably about 10-.3<br>More preferably about 5-1<br>Most Preferably about 4-2<br>About 3.00, for example |
| Alkanolamide surfactant (preferred brand: Witcamide 511) | Emulsifier | Preferably about 1.0-.05<br>More preferably about 0.35-.1<br>Most Preferably about .33-.2<br>About 0.30, for example |
| Triethanolamine | Neutralizer | Preferably about 1.0-.1<br>More preferably about .8-.25<br>Most Preferably about .6-.3<br>About 0.40, for example |

Figures 3, 4:
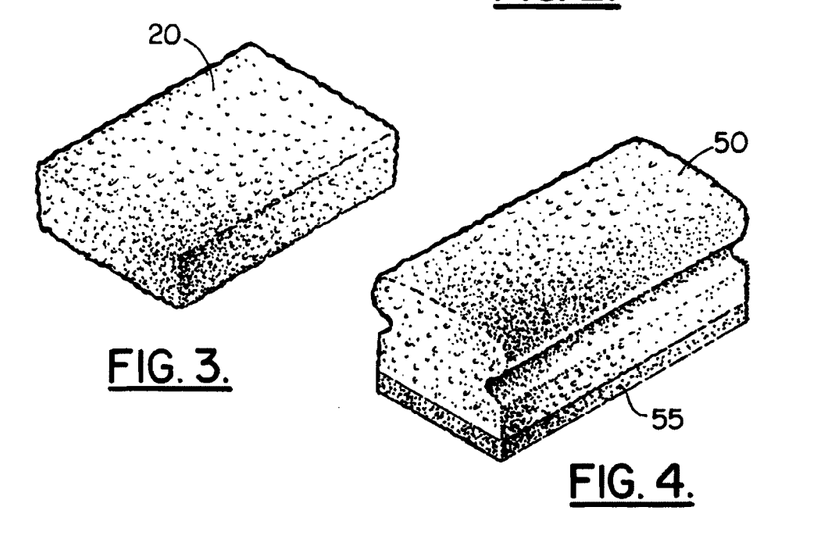
FIG. 3 shows a sponge of a preferred embodiment of the apparatus of the present invention.
FIG. 4 shows a sponge of a preferred embodiment where the sponge includes a scrubber surface.
Figures 5, 6, 7, 8:
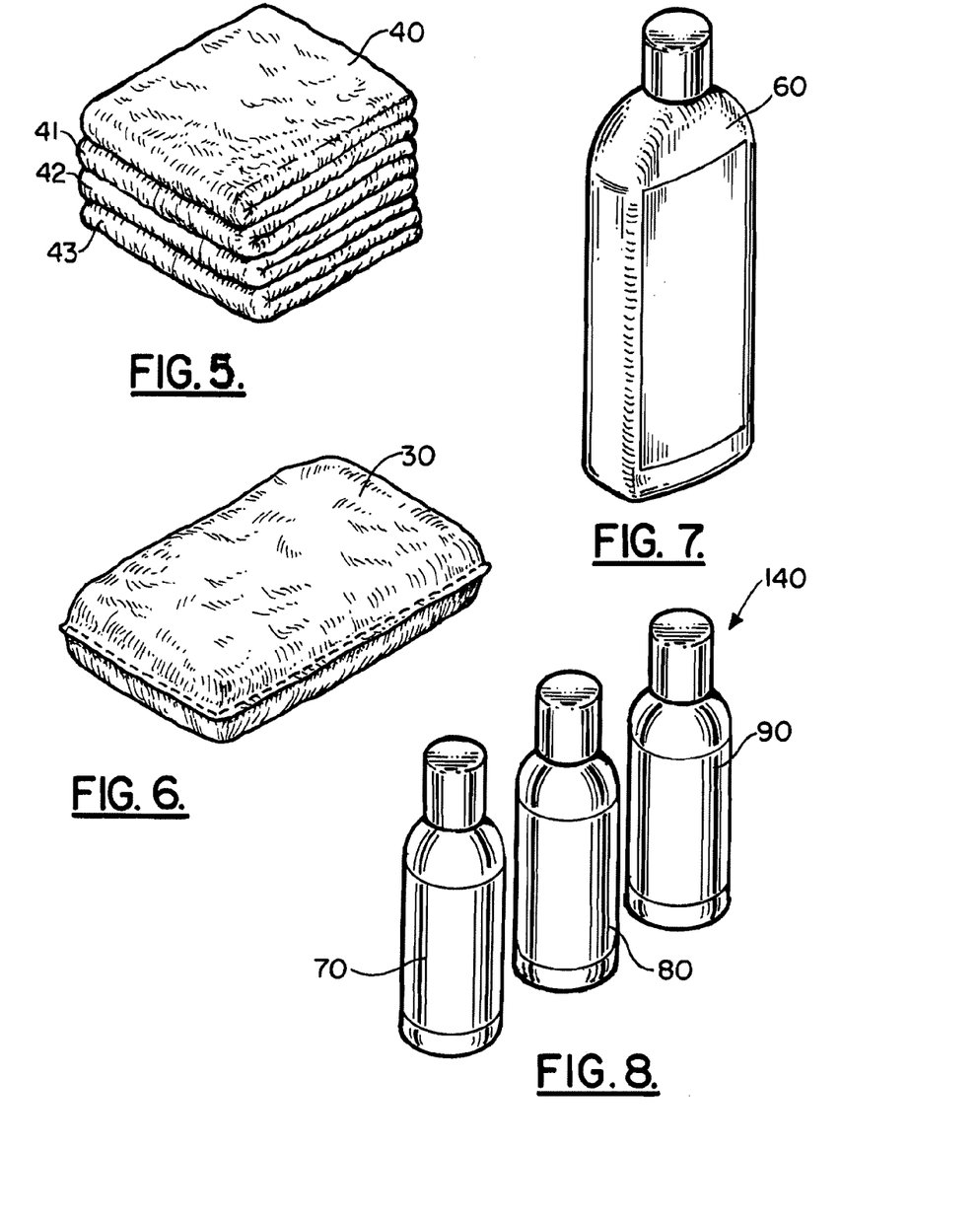
FIG. 5 shows a set of microfiber towels of a preferred embodiment of the apparatus of the present invention.
FIG. 6 shows a terry cloth applicator sponge of a preferred embodiment of the apparatus of the present invention.
FIG. 7 shows a container of the wax of a preferred embodiment of the apparatus of the present invention.
FIG. 8 shows a cleaning/protecting kit of a preferred embodiment of the apparatus of the present invention, including a clay cleaning preparation for cleaning glass, a glass and surface cleaner, and a glass protectant.

FIGS. 1 and 2 show an aerosol can 10 with sponge 20 wherein a wrapper 25 packages both sponge 20 and can 10. Cap 12 has been removed to show valve 11. FIG. 3 shows sponge 20 of a preferred embodiment. FIG. 4 shows sponge 50 of a preferred embodiment where sponge 50 includes a scrubber surface 55. Scrubber surface 55 can comprise a surface of relatively rougher material than the remainder of sponge 50. Sponge 50 with bottom 55 can have measurements of 4½ inches by 2¾ inches by 1¾ inches, but such measurements can vary. Upper portion of sponge 50 can be a synthetic or foam and yellow in color. Scrubber surface 55 can be a synthetic woven fiber creating a rough surface capable of removing contaminants without scratching a painted or glass surface, and preferably of red color. One acceptable surface is found in conventionally available scrubber sponges which are rectangular in shape such as that sold under the trade name SOS™. FIG. 5 shows a set of microfiber towels 40, 41, 42, and 43 folded and stacked one on top of each other. FIG. 6 shows a terry cloth applicator sponge 30. FIG. 7 shows a container 60 which is preferred for wax.

Various kits 140, 150, 160, 170, 180, and 190 are shown in FIGS. 8 through 13. The kits include various combinations of the clay embodiment, wax and wax applicator embodiment, sponge embodiment, and microfiber cloth embodiment. Such kits can include wax and bottle 60, applicator sponge 30, and microfiber cloth 40; or wax and bottle 60 and applicator 30; or clay cleaner and can 10, sponge 20, and microfiber cloth 40.

FIG. 8 shows a cleaning/protecting kit 140 of a preferred embodiment of the apparatus of the present invention, including a clay cleaning preparation 70 for cleaning glass, a glass and surface cleaner 80, and a glass protectant 90.

Figure 9:
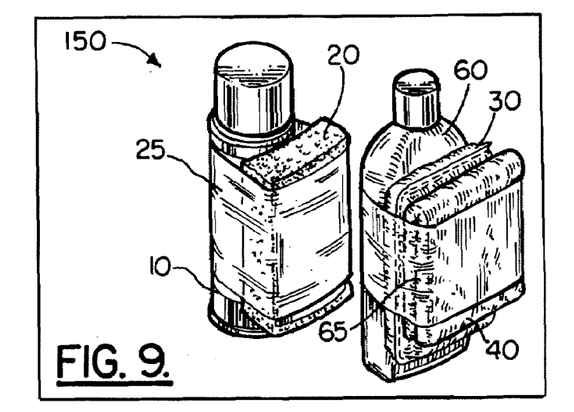
FIG. 9 shows a cleaning/protecting kit of a preferred embodiment of the apparatus of the present invention, including a clay cleaning preparation for cleaning paint, a paint protectant, a sponge for use with the clay cleaning preparation, a wax applicator, and a microfiber towel for use with the cleaning preparation and/or the wax.
Figure 10:
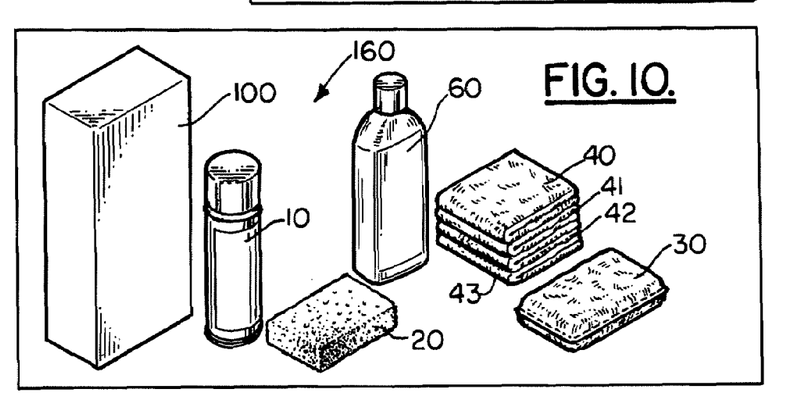
FIG. 10 shows various components from FIG. 9 where such components have been separated.

FIG. 9 shows a cleaning/protecting kit of a preferred embodiment of the apparatus of the present invention, including a clay cleaning preparation 10 for cleaning painted surfaces, a paint protectant or wax and bottle 60, a sponge 20 for use with the clay cleaning preparation, a wax applicator 30, and a microfiber towel 40 for use with the cleaning preparation and/or the wax. Wrappers 25 and 65 are used to package the components. FIG. 10 shows a protecting kit 160 wherein the components shown in FIG. 6B have been separated. A container, such as box 100 for containing all parts of kit 160, and additional microfiber towels 41, 42, 43 are also shown.

Figure 11:
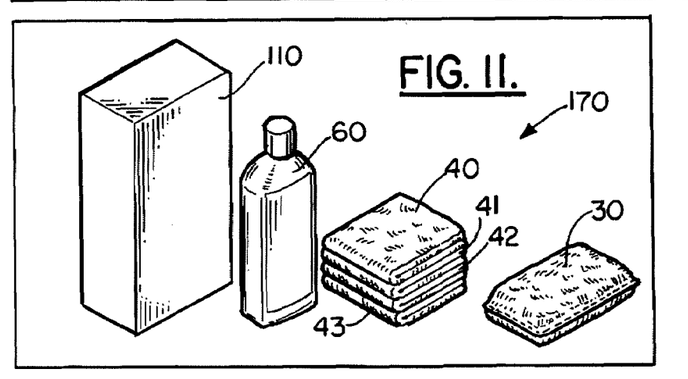
FIG. 11 shows a protecting kit of a preferred embodiment of the apparatus of the present invention, including a paint protectant or wax, a wax applicator, and a microfiber towel for use with the wax.

FIG. 11 shows a protecting kit 170 of a preferred embodiment of the apparatus of the present invention, including a paint protectant or wax in bottle 60, a wax applicator 30, and a microfiber towel 40 for use with the wax. A container, such as box 110 for containing all parts of kit 170, and additional microfiber towels 41, 42, 43 are also shown.

Figure 12:
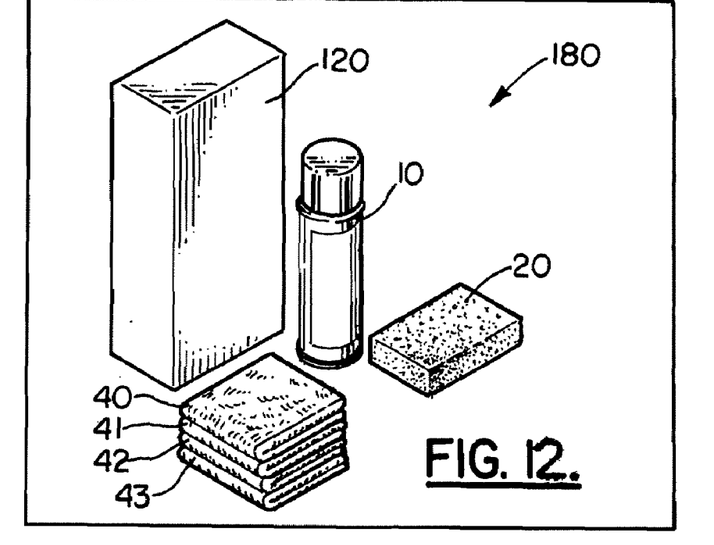
FIG. 12 shows a cleaning kit of a preferred embodiment of the apparatus of the present invention, including a clay cleaning preparation for cleaning surfaces such as painted, glass, and plastic, a sponge for use with the clay cleaning preparation and a microfiber towel for use with the cleaning preparation.

FIG. 12 shows a cleaning kit 180 of a preferred embodiment of the apparatus of the present invention, including a clay cleaning preparation 10 for cleaning painted surfaces, a sponge 20 for use with the clay cleaning preparation and a microfiber towel 40 for use with the cleaning preparation. A container, such as box 120 for containing all parts of kit 180, and additional microfiber towels 41, 42, 43 are also shown.

Figure 13:
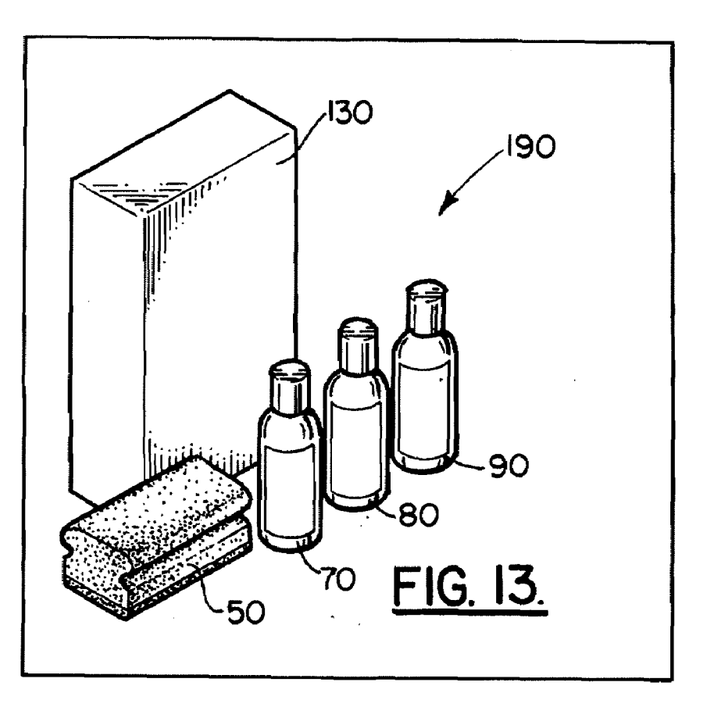
FIG. 13 shows a cleaning/protecting kit of a preferred embodiment of the apparatus of the present invention, including a clay cleaning preparation for cleaning glass, a glass and surface cleaner, and a glass protectant plus a scrubber sponge.

FIG. 13 shows a cleaning kit 190 of a preferred embodiment of the apparatus of the present invention, clay cleaning preparation 70 for cleaning glass, a glass and surface cleaner 80, and a glass protectant 90. A container, such as box 130 for containing all parts of kit 190, and scrubber sponge 50 are also shown.

The following is a list of reference numerals:

LIST FOR REFERENCE NUMERALS

| (Reference No.) | (Description) |
|---|---|
| 10 | can |
| 11 | valve |
| 12 | cap |
| 20 | sponge |
| 25 | wrapper |
| 30 | sponge |
| 40 | microfiber towel |
| 41 | microfiber towel |
| 42 | microfiber towel |
| 43 | microfiber towel |
| 50 | sponge |
| 55 | scrubber surface |
| 60 | bottle |
| 65 | wrapper |
| 70 | can of clay cleaning preparation |

-continued

| LIST FOR REFERENCE NUMERALS | |
|---|---|
| (Reference No.) | (Description) |
| 80 | can of glass and surface cleaner |
| 90 | can of glass protectant |
| 100 | box |
| 110 | box |
| 120 | box |
| 130 | box |
| 140 | kit |
| 150 | kit |
| 160 | kit |
| 170 | kit |
| 180 | kit |
| 190 | kit |

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. A method of cleaning auto glass having acid rain deposits and/or mineral deposits, comprising:
spraying on the auto glass a clay glass cleaner comprising:
clay for freeing mineral deposits;
sodium bicarbonate for neutralizing acid rain deposits; and
a chelator to keep the deposits from clinging on the auto glass and re-depositing;
allowing the cleaner to sit on the auto glass for a period of time;
rubbing the cleaner off.

2. The method of claim 1, wherein the clay glass cleaner is a foaming clay glass cleaner.

3. The method of claim 1, wherein the chelator is sodium tripolyphosphate.

4. The method of claim 1, wherein the cleaner is formulated as a convenient, effective aerosol foam.

5. The method of claim 1, wherein the cleaner is formulated as a convenient, effective aerosol spray.

6. The method of claim 1, wherein the clay is kaolin clay.

7. The method of claim 1, wherein the cleaner further comprises a synthetic detergent to clean away and suspend both mineral deposits and acid rain deposits.

8. The method of claim 1, wherein the cleaner includes an aerosol foaming propellant.

9. The method of claim 1, wherein the cleaner is allowed to sit on the auto glass for 5-15 minutes.

10. The method of claim 1, wherein the cleaner is rubbed off with a soft cloth.

11. A method of cleaning an automobile glass, or an automobile painted surface having acid rain deposits and/or mineral deposits, comprising:
spraying on the glass or the painted surface a clay cleaner comprising:
kaolin clay for freeing mineral deposits, wherein the amount of clay ranges between about 5 and 25 weight percent;
sodium bicarbonate for neutralizing acid rain deposits; and
a chelator to keep the deposits from clinging on the glass or the painted surface and re-depositing;
allowing the cleaner to sit on the glass or the painted surface for a period of time; and
rubbing the cleaner off.

12. The method of claim 11, wherein the chelator is sodium tripolyphosphate.

13. The method of claim 11, wherein the cleaner further comprises a synthetic detergent to clean away and suspend both mineral deposits and acid rain deposits.

14. The method of claim 11, wherein the cleaner includes an aerosol foaming propellant.

15. The method of claim 11, wherein the amount of clay ranges between about 6 and 15 weight percent.

16. The method of claim 11, wherein the amount of clay ranges between about 7 and 12 weight percent.

17. The method of claim 11, wherein the amount of clay is about 10 weight percent.

18. The method of claim 11, wherein the cleaner is allowed to sit on the glass or the painted surface for 5-15 minutes.

19. The method of claim 11, wherein the cleaner is rubbed off with a soft cloth.

20. The method of claim 11, wherein the cleaner is formulated as a convenient, effective aerosol foam.

21. The method of claim 11, wherein the cleaner is formulated as a convenient, effective aerosol spray.

* * * * *

UNITED STATES PATENT AND TRADEMARK OFFICE
CERTIFICATE OF CORRECTION

| | | |
|---|---|---|
| PATENT NO. | : 7,282,100 B1 | Page 1 of 1 |
| APPLICATION NO. | : 10/898890 | |
| DATED | : October 16, 2007 | |
| INVENTOR(S) | : Bryan Schouest et al. | |

It is certified that error appears in the above-identified patent and that said Letters Patent is hereby corrected as shown below:

On the Title page, add the following after the listing of the inventors:

-- (73)    Assignee:    Palm Beach Motoring Accessories, Inc. , Stuart, FL (US) --

On the Title page, add the following after the line listing the Primary Examiner in the second column:

-- (74)    *Attorney, Agent, or Firm* -- Garvey, Smith, Nehrbass &

North, L.L.C.; Seth M. Nehrbass; Brett A. North --

Signed and Sealed this

Eighteenth Day of December, 2007

JON W. DUDAS
*Director of the United States Patent and Trademark Office*